United States Patent Office 3,357,982
Patented Dec. 12, 1967

3,357,982
1-(5H-DIBENZO[a,d]CYCLOHEPTEN-5-YL)-4-
ALKYLPIPERAZINES
Cornelis van der Stelt, Haarlem, Netherlands, assignor to
N.V. Koninklijke Pharmaceutische Fabrieken v/h Bro-
cades Stheeman en Pharmacia, Amsterdam, Nether-
lands, a corporation of Dutch law
No Drawing. Filed May 17, 1965, Ser. No. 456,476
Claims priority, application Great Britain,
Aug. 18, 1964, 33,749/64
2 Claims. (Cl. 260—268)

This invention relates to new piperazine derivatives and their acid-addition salts, to processes for their preparation and pharmaceutical compositions containing them.

According to the present invention, there are provided the new 1-(5H-dibenzo[a,d]cyclohepten-5-yl) - 4 - alkyl-piperazines of the general formula

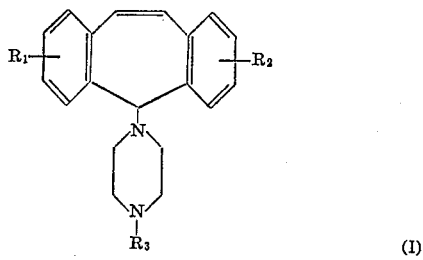

(I)

wherein $R_1$ and $R_2$ are the same or different and each represents a hydrogen or halogen atom or a lower alkyl group, and $R_3$ represents a lower alkyl group, and their acid-addition salts. By the term "lower alkyl" as used in this specification is meant straight or branched alkyl groups having from one to six carbon atoms.

The aforesaid new 1-(5H-dibenzo[a,d]cyclohepten-5-yl)-4-alkylpiperazines have a strong vesicatory activity even in very low concentrations. For therapeutic purposes they may be employed as such or in the form of non-toxic acid-addition salts, i.e., salts which are not harmful to the animal organism when used in therapeutic doses, derived from inorganic acids such as the hydrohalic acids (e.g., hydrochloric and hydrobromic acids), sulphuric, nitric and phosphoric acids, and organic acids such as oxalic, maleic, tartaric, citric, acetic, fumaric and succinic acids.

According to a feature of the present invention, the piperazine derivatives of Formula I are prepared by the process which comprises reacting a compound of the formula

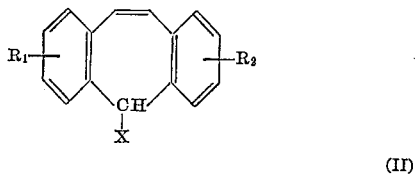

(II)

(wherein $R_1$ and $R_2$ are as hereinbefore defined and X represents a halogen, preferably chlorine, atom) with a piperazine compound of the formula

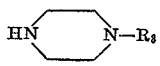

(III)

(wherein $R_3$ is as hereinbefore defined). The reaction is preferably carried out by heating the reactants in an inert organic solvent, such as benzene, toluene or xylene. It is suitable to add an acid-binding agent for example an alkali metal (e.g., sodium or potassium) or alkaline earth metal carbonate, oxide or hydroxide, e.g., sodium or potassium carbonate. An excess of the piperazine compound (i.e., from two to ten times excess) may also serve as the acid-binding agent. The products obtained by the aforesaid process may be purified either by distillation of the base or by conversion of the base in manner known per se into an acid-addition salt followed by crystallization of the acid-addition salt from a suitable liquid medium.

The starting materials of Formula II may be obtained by treating a 5H-dibenzo[a,d]cyclohepten-5-ol of the formula

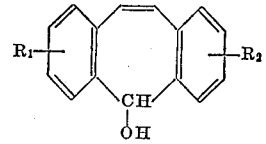

(IV)

with a hydrohalic acid (e.g., hydrochloric or hydrobromic acid), a thionyl halide (e.g., thionyl chloride or thionyl bromide), a phosphorus halide (e.g., phosphorus pentachloride), or a phosphorus oxyhalide (e.g., phosphorus oxychloride).

The following examples illustrate the invention. All temperatures are in degrees centigrade unless otherwise stated.

EXAMPLE 1

22.6 g. (0.1 mol) of 5H-dibenzo[a,d]cyclohepten-5-yl chloride in 200 ml. of toluene are added dropwise with stirring to a refluxing solution of 20.0 g. (0.2 mol) of N-methylpiperazine in 80 ml. of toluene. Refluxing is continued for a period of 5 hours after completion of the addition. The mixture is cooled to room temperature and water is added. The toluene layer is separated, dried with sodium sulphate and filtered. Toluene is distilled off. The remaining crude 1-(5H-dibenzo[a,d]cyclohepten-5-yl)-4-methylpiperazine is boiled with ether. Insoluble material is filtered off and crystallized from petroleum ether (boiling range 40–60° C.). The melting point of the pure substance thus obtained is 138–140° C.

*Analysis.*—Calc'd. for $C_{20}H_{22}N_2$: C, 82.72%; H, 7.64%; N, 9.65%. Found: C, 82.84%; H, 7.88%; N, 9.80%.

The 5H-dibenzo[a,d]cyclohepten - 5 - yl chloride employed as starting material may be prepared as follows:

62.4 g. of 5H-dibenzo[a,d]cyclohepten-5-ol is dissolved in 300 ml. of benzene and hydrogen chloride is passed through the solution for half an hour. The solution is dried with calcium chloride and, after filtration, evaporated to dryness to remove all hydrogen chloride. The residue is washed with small portions of petroleum ether (boiling range 80–100° C.). The 5H-dibenzo[a,d]cyclohepten-5-yl chloride thus obtained can be used for the above reaction without further purification.

By following the procedure described in the above example but replacing the 5H-dibenzo[a,d]cyclohepten-5-yl chloride by the corresponding 3-chloro- and 3-methyl- compounds, there are obtained 1-(3-chloro-5H-dibenzo[a,d]cyclohepten-5-yl) - 4 - methylpiperazine and 1 - (3 - methyl - 5H - dibenzo[a,d]cyclohepten - 5 - yl)-4-methylpiperazine respectively.

EXAMPLE 2

Following the procedure of Example 1 but utilizing N-propylpiperazine in lieu of N-methylpiperazine will yield 1-(5H-dibenzo[a,d]cyclohepten-5-yl)-4-propylpiperazine.

EXAMPLE 3

When the procedure of Example 1 is repeated and 7-ethyl-3-chloro - 5H - dibenzo[a,d]cyclohepten-5-yl chloride is utilized in lieu of 5H-dibenzo[a,d]cyclohepten-5-yl chloride, the corresponding 1-(7-ethyl - 3 - chloro-5H-dibenzo[a,d]cyclohepten-5-yl) - 4 - methylpiperazine is obtained.

The invention includes within its scope pharmaceutical compositions containing one or more of the piperazine derivatives of Formula I, or non-toxic acid-addition salt thereof, in association with a pharmacologically acceptable carrier.

The compositions may take any of the forms customarily employed for administration of therapeutically active substances but the preferred types are those suitable for oral administration and especially tablets, pills, and capsules including the substance. The tablets and pills may be formulated in manner known per se with one or more pharmacologically acceptable diluents or excipients, for example lactose or starch, and include materials of a lubricating nature, for example calcium stearate. Capsules made of absorbable material, for example gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, for example liquid paraffin, or a syrup or elixir base. The active substance may also be made up in a form suitable for parenteral administration, i.e., as a suspension or emulsion in sterile water or an organic liquid usually employed for injectable preparations, for example a vegetable oil such as olive oil, or a sterile solution in an organic solvent.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound selected from the group consisting of a compound having the formula

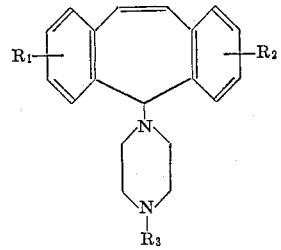

wherein $R_1$ and $R_2$ are selected from the group consisting of hydrogen, halogen and lower alkyl, and $R_3$ is lower alkyl, and the acid-addition salts thereof.

2. 1-(5H-dibenzo[a,d]cyclohepten-5-yl)-4-methylpiperazine.

References Cited

UNITED STATES PATENTS

| | | | |
|---|---|---|---|
| 3,167,541 | 1/1965 | Van der Stelt | 260—268 |
| 3,014,911 | 12/1961 | Engelhardt | 260—293 |
| 3,209,007 | 9/1965 | Harms | 260—294 |
| 3,227,716 | 1/1966 | Harms | 260—247.2 |

OTHER REFERENCES

Villani et al.: J. Med. and Pharm. Chem., vol. 5, No. 2 (1962), pages 373–74.

HENRY R. JILES, *Primary Examiner.*

ALEX MAZEL, *Examiner.*